United States Patent [19]

Tullio

[11] 4,063,880
[45] * Dec. 20, 1977

[54] CONCENTRATED DISAZO DYE-SURFACTANT SOLUTION

[75] Inventor: Victor Tullio, Wilmington, Del.

[73] Assignee: E. I. Du Pont de Nemours and Company, Wilmington, Del.

[*] Notice: The portion of the term of this patent subsequent to May 18, 1993, has been disclaimed.

[21] Appl. No.: 629,549

[22] Filed: Nov. 6, 1975

Related U.S. Application Data

[63] Continuation-in-part of Ser. No. 462,395, April 19, 1974, Pat. No. 3,957,425.

[51] Int. Cl.$^2$ .............. C09B 27/00; C09B 31/02; D06P 1/02
[52] U.S. Cl. .............. 8/41 R; 8/42 R; 8/79; 8/85 R; 8/89 R; 8/93; 8/169; 260/174
[58] Field of Search .............. 8/41 B, 41 R, 89 R, 8/85 R, 88, 93, 169

[56] References Cited

U.S. PATENT DOCUMENTS

| | | | |
|---|---|---|---|
| 3,153,564 | 10/1964 | Morgan | 8/83 |
| 3,203,753 | 8/1965 | Sherburne | 8/83 |
| 3,288,552 | 11/1966 | Streck | 8/44 |
| 3,622,264 | 11/1971 | Brown et al. | 8/21 |
| 3,658,456 | 4/1972 | Hertel | 8/44 |
| 3,957,425 | 5/1976 | Tullio | 8/41 B |

OTHER PUBLICATIONS

Kern, R., American Dyestuff Reporter, May 15, 1961, pp. 45–52.

*Primary Examiner*—A. Lionel Clingman
*Attorney, Agent, or Firm*—James A. Costello

[57] ABSTRACT

An improved aqueous-organic solvent solution, having a pH between 10 and 13, of the disazo dye

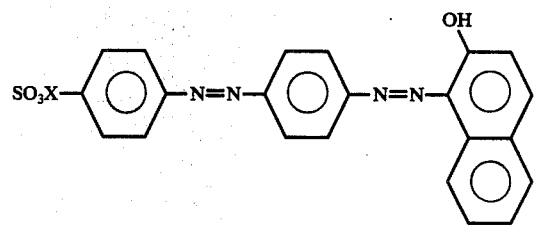

wherein X is a cation, preferably the sodium or lithium cation, having therein a combination of i. 0.1% to 10%, by total weight, of a particular anionic surfactant, and
ii. 0.1% to 10.0%, by total weight, of a particular nonionic surfactant.

11 Claims, No Drawings

CONCENTRATED DISAZO DYE-SURFACTANT SOLUTION

CROSS-REFERENCE TO RELATED APPLICATION

This is a continuation-in-part application of copending application Ser. No. 462,395, filed on Apr. 19, 1974, now U.S. Pat. No. 3,957,425.

BACKGROUND OF THE INVENTION

The sodium salt of the dye described herein is known as Acid Red 151, Color Index No. 26,900. It is very effective for dyeing synthetic fibers, especially nylon. It is necessary to employ water miscible solvent(s) to aid in dissolving this disazo dye so that it will be in acceptable form for transport and use. Usually, transported solutions will have about 15% to 25% dye in solution.

Problems can arise, however, even though dye solubility is achieved for shipping and handling. For instance, when the dye liquid is diluted with additional water prior to use in a dyeing operation, the dye itself often comes out of solution. In some cases, it comes out of solution in the form of a gel, a solid phase colloidal solution. Once formed, such a gel can block transfer lines and can be very difficult to remove. The invention provides a way of overcoming this difficulty by eliminating the gelling tendency of this particular disazo dye. With the concentrated dye-surfactant solutions of this invention, water dilution of the dye concentrate results in a desirable nongelling fluid dispersion of the dye which can be handled easily.

SUMMARY OF THE INVENTION

This invention concerns an improved aqueous-organic solvent solution, having a pH between 10 and 13, of the salt of the disazo dye, p-(p-2-hydroxy-1-naphthylazo)phenylazo)benzenesulfonic acid,

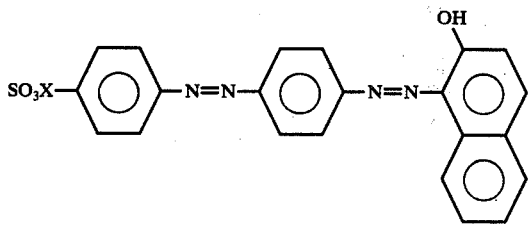

wherein X is selected from the group sodium, potassium, lithium and ammonium cations, the improvement comprising presence in the dye solution of a combination of i. 0.1% to 10.0%, by total weight, of an anionic surfactant, and ii. 0.1% to 10.0%, by total weight, of a nonionic surfactant, the ratio of anionic surfactant to nonionic surfactant being between 1 to 20 and 17 to 1, the dye solution having a dye concentration in the range of 15% to 25% based on the total weight of the solution, said solution being nongelling upon dilution with water, the anionic surfactant being a water-soluble salt selected from at least one member of the group consisting of substituted benzenesulfonic acid salt, substituted naphthalenesulfonic acid salt, and sulfonated naphthaleneformaldehyde condensate salt, the nonionic surfactant being selected from at least one member of the group consisting of condensates of a. $C_4$ to $C_{24}$ alkyl primary amines and at least 5 moles of propylene oxide, b. $C_4$ to $C_{24}$ alkyl primary amines and at least 5 moles of ethylene oxide, c. $C_{12}$ to $C_{24}$ alcohols and at least 15 moles of ethylene oxide, d. $C_{12}$ to $C_{24}$ alcohols and at least 5 moles of propylene oxide, e. $C_4$ to $C_{24}$ alcohols and at least 8 moles of ethylene oxide and 2 moles of propylene oxide, f. alkyl phenols and at least 8 moles of ethylene oxide, and g. ethylene oxide and polypropylene ether glycol which is derived from propylene glycol and propylene oxide said glycol having a molecular weight from about 1,000 to 10,000, said condensate having a proportion derived from ethylene oxide of 20 to 80 weight percent.

Sodium and lithium dye salts are preferred. The particular cation employed has little to do with the coloring properties of the dye. Although calcium, magnesium and other salt forms of the dye provide substrate coloring under certain conditions, they are not sufficiently soluble to give strong aqueous solutions. Of those representative cations pointed out herein, it is noted that the ammonium cation can be substituted as well as unsubstituted as will be obvious to those skilled in the art.

The solution of the invention is prepared (typically) by mixing water, organic solvent, and alkali, and dissolving the dye therein. The surfactants are then added in amounts up to about 20.0% of the total weight.

DETAILS OF THE INVENTION

The contemplated anionic surfactant is a water-soluble salt of at least one member of the group consisting of substituted benzenesulfonic acid, substituted naphthalenesulfonic acid, and sulfonated naphthaleneformaldehyde condensates. The contemplated substituents are 1 to 3 alkyl groups of $C_1$ to $C_{14}$. Mixtures of said anionic surfactants are specifically included. The salts are preferably alkali metal salts, and most preferably sodium salts, although they can also be ammonium or substituted ammonium salts, or salts of organic bases such as would readily occur to those skilled in the art.

Examples of useful substituted benzenesulfonic acid salts are sodium dodecylbenzenesulfonate, sodium xylenesulfonate, and sodium trialkylbenzenesulfonate. Sodium dibutylnaphthalenesulfonate is an example of a useful substituted naphthalenesulfonic acid salt. The most preferred anionic surfactant is the following sulfonated naphthaleneformaldehyde condensate salt:

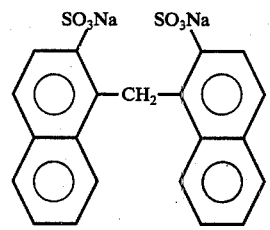

The contemplated nonionic surfactant is selected from at least one member of the group consisting of condensates of (a) $C_4$ to $C_{24}$ alkyl primary amines and at least 5 moles of propylene oxide, (b) $C_4$ to $C_{24}$ alkyl primary amines and at least 5 moles of ethylene oxide, (c) $C_{12}$ to $C_{24}$ alcohols and at least 15 moles of ethylene oxide, (d) $C_{12}$ to $C_{24}$ alcohols and at least 5 moles of propylene oxide, (e) $C_4$ to $C_{24}$ alcohols and at least 8 moles of ethylene oxide and 2 moles of propylene oxide, (f) alkyl phenols and at least 8 moles of ethylene oxide, and (g) ethylene oxide and polypropylene ether glycol which is derived from propylene glycol and propylene oxide said glycol having a molecular weight from about 1,000 to 10,000, said condensate having a proportion derived from ethylene oxide of 20 to 80 weight percent. The alkyl members of the amine, alcohol and phenol can be straight or branched chain, and the alkyl group(s) on the phenol can have up to about 24 carbons. Mixtures of nonionic surfactants have been found particularly useful.

The organic, water-miscible solvents employed in the dye solutions of this invention are aliphatic ethers or alcohols, of up to about 250 in molecular weight. Operable solvents will be obvious to those skilled in the art. Such solvents include cellosolve, methyl cellosolve, ethylene glycol, carbitol, metyl carbitol, butyl carbitol, $C_1$ to $C_4$ alkyl ethers of ethylene glycol and similar compounds.

When the nonionic surfactant is ethylene oxide condensed with an amine, at least 5 moles of ethylene oxide per mole of amine is required to produce satisfactory products. When an ethylene oxide condensate with an alcohol is employed, at least 15 moles of ethylene oxide per mole of alcohol is required. When a condensation product of propylene oxide with an alcohol is employed, as few as 5 moles of propylene oxide per mole of alcohol can be employed. The hydrocarbon alcohol when condensed with ethylene oxide alone or propylene oxide alone should contain at least about 12 carbon atoms. When condensed with both ethylene oxide and propylene oxide, the alcohol can have as few as 4 carbon atoms, there being at least about 10 moles of alkylene oxide present, at least two of which are propylene oxide.

The most widely available commercial ethylene oxide-alkyl phenol additives are those obtained from nonylphenol. Compounds with eight or more ethylene oxide molecules added to one molecule of nonylphenol function satisfactorily in the compositions of the invention.

The commercial ethylene oxide-propylene oxide copolymers, called "Pluronics" are structured

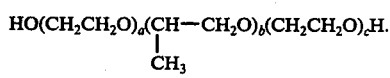

They are characterized by designating the molecular weight of the polypropylene ether glycol core which is the condensate of propylene oxide with propylene glycol, and the percent derived from ethylene oxide. The copolymers found most useful in the invention have a core molecular weight of about 950 to 2500 and an ethylene oxide derived percent by weight of about 20 to 80. The value of $a + c$ in the depicted copolymer structure is usually between 4 to 45 and the value of $b$ is usually between 16 to 42.

The preferred nonionic surfactant is the compound obtained by reacting commercial tallowamine with about 50 moles of ethylene oxide per mole of amine. Tallowamine is prepared from naturally-occurring materials and is commercially available as, essentially, a mixture of $C_{16}$ and $C_{18}$ straight chain saturated aliphatic amines, with a small amount of unsaturated chain material also present. The ethoxylated product contains molecules having less than 50 ethylene oxide units per amine molecule and some molecules containing more than 50 ethylene oxide units per amine molecule. The average number is close to 50.

A second preferred nonionic surfactant is an additive prepared from a commercially available mixture of saturated straight chain $C_{12, 14\ and\ 16}$ alcohols averaging about $C_{13}$. The additive is prepared by adding first 8 moles of ethylene oxide per mole of alcohol, then adding additionally 8 moles of propylene oxide per mole of alcohol. The starting alcohols are those commercially available mixtures prepared by the hydration of ethylene oligomers.

A partial list of operable nonionic surfactants are set out giving the trademarks and the known chemical constituency:

| | |
|---|---|
| "Merpol" DA | $C_{16-18}$ tallowamine + 50 ethylene oxide units |
| "Merpol" LFH | $C_{12-16}$ alcohol + 8 EO units and 8 propylene oxide units |
| "Alkanol" ACN | $C_{16-18}$ tallowamine + 16 EO units |
| "Igepal" CO 630 | Nonylphenyl + 9 EO units |
| "Ingepal" CO 890 | Nonylphenyl + >30 EO units |
| "Pluronic" L-42 | 1200 M.W. of propylene oxide part + 20% EO |
| "Pluronic" P85 | 2250 M.W. of propylene oxide part + 50% EO |
| "Pluronic" F98 | 2750 M.W. of PO part + 80% EO |
| "Pluronic" L35 | 1950 M.W. of PO part + 50% EO |
| "Pluronic" F38 | 1950 M.W. of PO part + 80% EO |
| "Brij" 35 | $C_{12}$ alcohol + 25 EO units. |

A partial list of nonionic surfactants that have been found inoperable in this invention, because dye gels were formed upon attempted water dilution of solutions containing the requisite dye and the requisite anionic surfactants and said nonionic surfactants:

| | |
|---|---|
| "Merpol" OE | $C_{12-16}$ alcohol + 4.4 EO units |
| "Merpol" OJS | $C_{12-16}$ alcohol + 8.4 EO units |
| "Merpol 38 SE | $C_{13}$ alcohol + 5 EO units |
| "Merpol" SH | $C_{13}$ alcohol + 8 EO units |

The dye compositions of the invention can be used to dye nylon, wool and other substrates amenable to dyeing with acid dyes generally. Additionally, they have been found useful for coloring polyamide, phenolformaldehyde and other resins. For these latter purposes, the proportion of anionic surfactant should be quite high vs. the nonionic surfactant. Colored mixtures of dye and resin can be applied to substrates such as glass fibers to give colored assemblies and articles made from such fibers.

The following Examples illustrate the invention.

EXAMPLE 1

Into a suitable vessel were charged 20.0 parts of cellosolve, 5.26 parts of lithium hydroxide monohydrate and 5.26 parts of 30% sodium hydroxide aqueous solution. After heating the resulting solution to 50° to 55° C., 24.0 parts of the dye

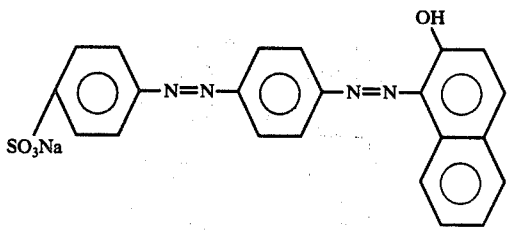

was added in the form of a water-wet filter cake containing about 36 parts of water. It was added slowly with good agitation, and when all had been added the mixture was held at 50° to 55° C. for 2 hours to complete solubilizaton. There were then added 1.2 parts of the nonionic surfactant, $C_{16-18}H_{33-37}NH(CH_2CH_2O)_{50}H$, prepared by ethoxylation of tallowamine, and 0.3 part of the anionic surfactant

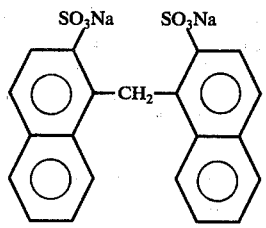

formed by condensation of formaldehyde and naphthalenesulfonic acid.

Strength of the solution was adjusted to equal a previously established standard (containing 22.8% dye) by adding additional cellosolve. Strength comparison was made by spectrophotometer. The pH of the solution was about 12.0. Before dilution, the dye concentrate contained about 1.2% of nonionic surfactant and about 0.3% of anionic sufactant. When this concentrate was mixed with an equal volume of water, a thin mobile liquid slurry resulted. When a composition similar to the above was prepared without the two surfactants, a similar dilution resulted in a thick gel.

EXAMPLE 2

To the dye concentrate prepared in Example 1 there was added 5 parts of the nonionic surfactant, "Pluronic" L42, which is the condensate of ethylene oxide and polypropylene ether glycol derived from propylene glycol and propylene oxide, said polypropylene ether glycol having a molecular weight of 1200 and said ethylene oxide proportion being 20 weight percent. The final dye solution had 6.2 parts of nonionic surfactant per 105 parts of solution, said nonionic surfactant being 5.9%, by total weight, of said solution. The anionic surfactant was 0.3 parts per 105 parts of solution, equivalent to about 0.3%, by total weight, of said solution.

After mixing well, the concentrated solution was tested by mixing 10 gram samples with 10 ml of water in one case and with 2 ml of water in a second case. No gelling occurred in either case, even after the diluted solutions were allowed to stand for 5 minutes.

The embodiments of the invention in which an exclusive property or privilege is claimed are defined as follows:

1. An improved aqueous-organic solvent solution having a pH between 10 and 13, of the disazo dye

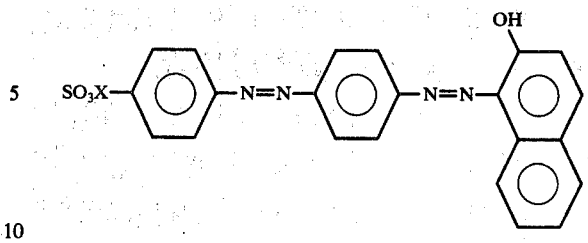

wherein X is a cation selected from the group sodium, potassium, lithium, and ammonium, the improvement comprising the presence in the dye solution of a combination of
 i. 0.1% to 10.0%, by total weight, of an anionic surfactant, and
 ii. 0.1% to 10.0%, by total weight, of a nonionic surfactant, the ratio of anionic surfactant to nonionic surfactant being between 1 to 20 and 17 to 1, the dye solutin having a dye concentration in the range of 15% to 25% based on the total weight of the solution, said solution being nongelling upon dilution with water,
the anionic surfactant being a water-soluble salt of at least one member of the group consisting of substituted benzenesulfonic acid salt, substituted naphthalenesulfonic acid salt, and sulfonated naphthaleneformaldehyde condensate salt,
the nonionic surfactant being selected from at least one member of the group consisting of condensates of
 a. $C_4$ to $C_{24}$ alkyl primary amines and at least 5 moles of propylene oxide,
 b. $C_4$ to $C_{24}$ alkyl primary amines and at least 5 moles of ethylene oxide,
 c. $C_{12}$ to $C_{24}$ alcohols and at least 15 moles of ethylene oxide,
 d. $C_{12}$ to $C_{24}$ alcohols and at least 5 moles of propylene oxide,
 e. $C_4$ to $C_{24}$ alcohols and at least 8 moles of ethylene oxide and 2 moles of propylene oxide,
 f. alkyl phenols and at least 8 moles of ethylene oxide, and
 g. ethylene oxide and polypropylene ether glycol which is derived from propylene glycol and propylene oxide said glycol having a molecular weight from about 1,000 to 10,000, said condensate having a proportion derived from ethylene oxide of 20 to 80 weight percent.

2. The dye solution of claim 1 wherein the nonionic surfactant is selected from at least one member of the group consisting of condensates of
 b. $C_4$ to $C_{24}$ alkyl primary amines and at least 5 moles of ethylene oxide,
 e. $C_4$ to $C_{24}$ alcohols and at least 8 moles of ethylene oxide and 2 moles of propylene oxide, and
 g. ethylene oxide and polypropylene ether glycol derived from propylene glycol and propylene oxide said glycol having a molecular weight from about 1,000 to 10,000, said condensate having a proportion derived from ethylene oxide of 20 to 80 weight percent.

3. The dye solution of claim 2 wherein the nonionic surfactant is (b), said surfactant being a condensate of about 50 moles of ethylene oxide per mole of amine, said amine being essentially a mixture of $C_{16}$ and $C_{18}$ straight chain saturated amines.

4. The dye solution of claim 3 wherein the nonionic surfactant is $C_{16\text{-}18}H_{33\text{-}37}NH(CH_2CH_2O)_{50}H$.

5. The dye solution of claim 2 wherein the nonionic surfactant is (g), said surfactant having a molecular weight of said glycol of about 1200 and a proportion derived from ethylene oxide of 20 weight percent.

6. The dye solution of claim 1 wherein the anionic surfactant is

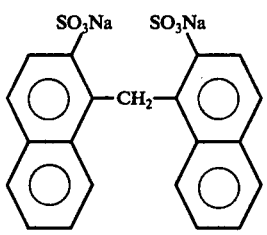

7. The dye solution of claim 2 wherein the anionic surfactant is

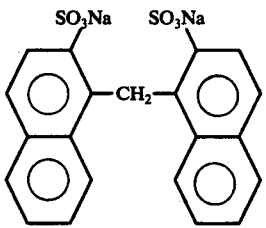

8. The dye solution of claim 3 wherein the anionic surfactant is

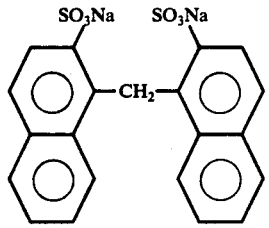

9. The dye solution of claim 4 wherein the anionic surfactant is

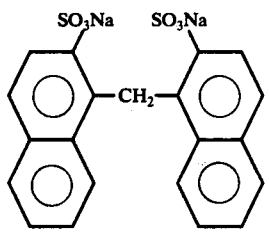

10. The dye solution of claim 5 wherein the anionic surfactant is

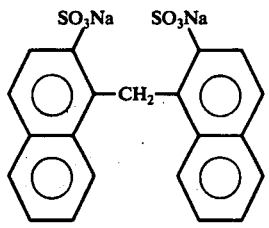

11. The dye solution of claim 6 wherein the nonionic surfactant is
   $C_{16\text{-}18}H_{33\text{-}37}NH(CH_2CH_2O)_{50}H$, and
   the condensate of ethylene oxide and polypropylene ether glycol which is derived from propylene glycol and propylene oxide said glycol having a molecular weight of about 1200, said condensate having a proportion derived from ethylene oxide of 20 weight percent.

* * * * *